United States Patent [19]
Yoshino

[11] Patent Number: 4,877,295
[45] Date of Patent: Oct. 31, 1989

[54] ANTISKID CONTROL DEVICE

[75] Inventor: Masato Yoshino, Itami, Japan

[73] Assignee: Sumitomo Electric Industries, Ltd., Osaka, Japan

[21] Appl. No.: 218,257

[22] Filed: Jul. 13, 1988

[30] Foreign Application Priority Data

Jul. 16, 1987 [JP] Japan ............................... 62-179337

[51] Int. Cl.$^4$ ........................... B60T 8/68; B60T 8/64
[52] U.S. Cl. ..................................... 303/109; 303/111; 188/181 C; 364/426.01; 364/426.02
[58] Field of Search ............... 303/91, 95, 96, 98, 303/100, 103, 106, 109, 110, 111; 364/426.01, 426.02, 426.03; 180/197; 188/181 C

[56] References Cited

U.S. PATENT DOCUMENTS

| | | | |
|---|---|---|---|
| 3,883,186 | 5/1975 | Rodi | 303/109 |
| 3,912,034 | 9/1975 | Pallof | 180/197 |
| 3,972,568 | 8/1976 | Fleischer | 303/111 |
| 4,504,911 | 3/1985 | Braschel et al. | 364/426.02 |
| 4,632,467 | 12/1986 | Kircher et al. | 303/110 X |
| 4,668,022 | 5/1987 | Sato | 303/96 X |
| 4,718,735 | 1/1988 | Ogino | 303/103 X |
| 4,783,126 | 11/1988 | Arikawa | 303/96 |

FOREIGN PATENT DOCUMENTS

| | | | |
|---|---|---|---|
| 2717457 | 11/1978 | Fed. Rep. of Germany | 303/96 |
| 13246 | 2/1981 | Japan | 303/96 |

Primary Examiner—Andres Kashnikow
Assistant Examiner—Timothy Newholm
Attorney, Agent, or Firm—Cushman, Darby & Cushman

[57] ABSTRACT

An antiskid control device including a vehicle speed estimating device for estimating a vehicle speed from a plurality of wheel speeds of the driven and undriven wheels of a motor vehicle. The vehicle speed estimating device includes a first comparator for comparing the speeds of the wheels, a storage for temporarily storing the estimated vehicle speed or an ultimately selected wheel speed, a second comparator for comparing the speed stored in the storage with the speeds of the driven wheels and a storage updating device for causing, at the time when antiskid control has been started, the storage of the estimated vehicle speed obtained at the time or the ultimately selected wheel speed obtained at the time. During nonexecution of antiskid control, a highest speed among the speeds of the undriven wheels is selected to calculate the speed of the vehice body, while during execution of antiskid control, another highest speed among the speeds of the undriven wheels and the speeds of the driven wheels lower than the speed stored in the storage is selected to calculate the speed of the vehicle body.

8 Claims, 3 Drawing Sheets

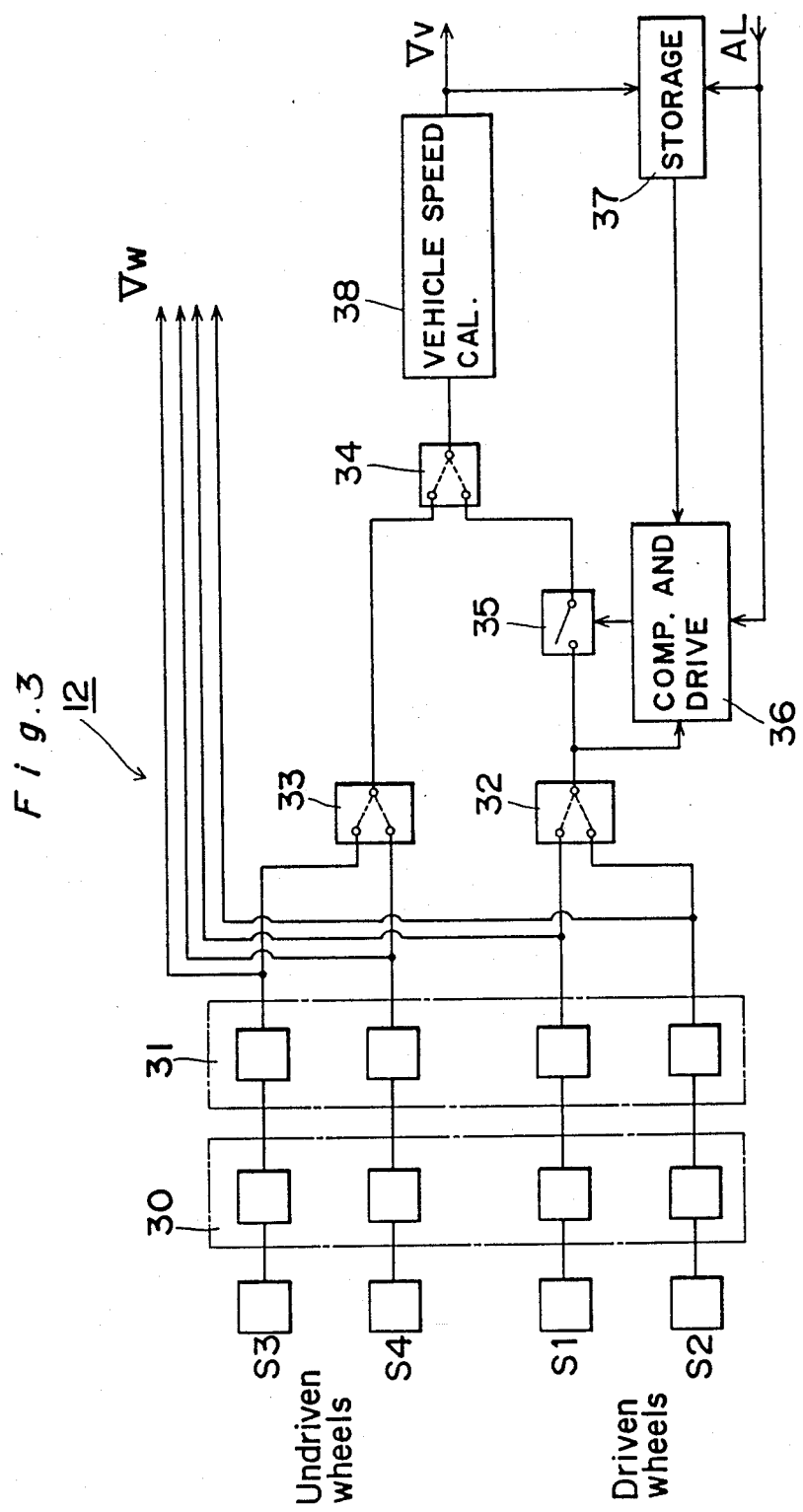

ANTISKID CONTROL DEVICE

BACKGROUND OF THE INVENTION

The present invention generally relates to anti-skid control and more particularly, to an antiskid control device which is provided with a means for properly estimating a speed of a vehicle body of a motor vehicle.

An antiskid control device is arranged to control a slip ratio of wheels to a value falling within a range enabling most efficient achievement of a frictional force exerted between a road surface and tires. It is to be noted that the slip ratio of the wheels is expressed by [(vehicle speed)−(wheel speed)]/(vehicle speed)×100 (%). Thus, the vehicle speed is an important factor in antiskid control. However, in most antiskid control devices in practical use at present, a means for directly measuring the vehicle speed is not provided. The vehicle speed is estimated from the wheel speed, and more specifically the wheel speed is calculated by using the higher wheel speed of the undriven wheels.

During normal operation of the motor vehicle, the higher wheel speed of the undriven wheels (free from wheel spin) can be regarded as the vehicle speed itself. It is to be noted that the term "wheel spin" in this specification represents a phenomenon in which tires rotate at an extremely high speed relative to a road surface because a driving force transmitted from an engine to the tires has exceeded a frictional limit between the tires and the road surface. However, during braking (especially, during execution of antiskid control), when each wheel randomly either approaches towards locking or recovers from locking, it is impossible to obtain an accurate vehicle speed from the wheel speed of a single wheel, even if the wheel is an undriven wheel.

Thus, in this case, it is desirable that the highest wheel speed at each time is selected from the wheel speeds of as many wheels as possible and is subjected to filtering, etc. to obtain the vehicle speed.

To this end, such a method may be adopted in which the vehicle speed is estimated from the highest wheel speed of the undriven wheels during nonexecution of antiskid control and from the highest wheel speed of all the wheels during execution of antiskid control. However, when the motor vehicle runs on a rather bumpy road surface, a case arises that a change of wheel speed due to the bumps is erroneously interspreted as a locking of the wheels. Namely, if the motor vehicle runs on the bumpy road surface in a state where wheel spin of the driven wheels may take place, antiskid control may be started. At this time, if the estimated vehicle speed is calculated from the driven wheels being subjected to wheel spin, the vehicle speed becomes extraordinarily high. Hence, it is decided that each wheel has a large slip ratio, and a pressure reducing command is issued to a brake system. Thus, braking is not effected even if the driver kicks the brake pedal fully.

This is a quite dangerous state for the motor vehicle. In order to obviate such an undesirable phenomenon, the following conntermeasure may be taken. A detection means for detecting the activation of the brake pedal is provided. During execution of antiskid control, the estimated vehicle speed is calculated from the highest wheel speed of all the wheels (including the driven wheels) only at the time when a brake pedal signal indicates that the brake pedal is activated. In this countermeasure, the estimated vehicle speed is calculated from the highest wheel speed of the undriven wheels when the brake pedal signal indicates that the brake pedal is not activated, i.e., when an accelerator pedal may be activated resulting in wheel spin of the driven wheels.

However, in this countermeasure, when the brake pedal detection means malfunctions or in the case of a front-wheel drive type motor vehicle with a parking brake provided at its rear wheels, the parking brake is activated prior to activation of the brake pedal, attention is paid only to the undriven wheels. Hence, the accuracy of the estimated vehicle speed during random approach of the wheels towards locking drops and, in an extreme case, although the vehicle body is being actually displaced, the estimated vehicle speed assumes zero, Thus, antiskid control is not performed.

SUMMARY OF THE INVENTION

To eliminate the above described disadvantages inherent in conventional antiskid control devices, an essential object of the present invention is to provide an antiskid control device in which (1) a vehicle speed is not calculated to an extraordinarily large value even if wheel spin occurs, and (2) the vehicle speed is not calculated to an excessively small value even when a detection means for detecting the activation of a brake pedal malfunctions or, in the case of a front-wheel drive type motor vehicle with a parking brake provided at its rear wheels, the parking brake is activated during the operation of the motor vehicle. Accordingly, highly accurate estimated vehicle speed can be obtained at all times.

In order to accomplish this object of the present invention, an antiskid control device according to the present invention includes: a vehicle speed estimating means for estimating a vehicle speed from a plurality of wheel speeds of driven and undriven wheels and the vehicle speed estimating means includes a first comparator means for comparing the speed of each wheel a storage means for temporarily storing the speed of the vehicle body calculated by the vehicle speed estimating means or one of the speeds of the wheels selected ultimately by the first comparator means, a second comparator means: for comparing the speed stored in the storage means with the speeds of the driven wheels; and a storage updating means for causing, at the time when antiskid control has been started, the storage means to store either the speed of the vehicle body calculated at the time by the vehicle speed estimating means or the wheel speed ultimately selected at the time by the first comparator means. During nonexecution of antiskid control, a highest speed among the speeds of the undriven wheels is selected such that the speed of the vehicle body is calculated on the basis of the highest speed, while during execution of antiskid control, another highest speed among the speeds of the undriven wheels and the speeds of the driven wheels lower than the speed stored in the storage means is selected such that the speed of the vehicle body is calculated on the basis of the another highest speed.

In the antiskid control device of the present invention, and even in the case where antiskid control is erroneously started during operation of the motor vehicle on a bumpy road, etc., the estimated vehicle speed is calculated from the wheel speed of the undriven wheels (free from wheel spin) and stored in the storage means. Thus, even if wheel spin occurs subsequently, the wheel speed of the driven wheels rotating at a higher speed than that stored in the storage means is not used for calculating the estimated vehicle speed, so that the estimated vehicle speed does not become extraordinarily high.

Furthermore, in the antiskid control device of the present invention, even in the case of a front-wheel drive type motor vehicle with a parking brake provided at its rear wheels, and the wheel speeds of the undriven wheels becomes excessively low upon activation of the parking brake prior to activation of the brake pedal, the wheel speeds of the driven wheels also can be used for calculating the estimated vehicle speed, after start of antiskid control. Thus, the estimated vehicle speed does not become excessively low.

BRIEF DESCRIPTION OF THE DRAWINGS

This object and features of the present invention will become apparent from the following description taken in conjunction with the preferred embodiment thereof with reference to the accompanying drawings, in which:

FIG. 3 also is a block diagram of a vehicle speed estimating means employed in the antiskid control device of FIG. 1.

DETAILED DESCRIPTION OF THE INVENTION

Figure 1:
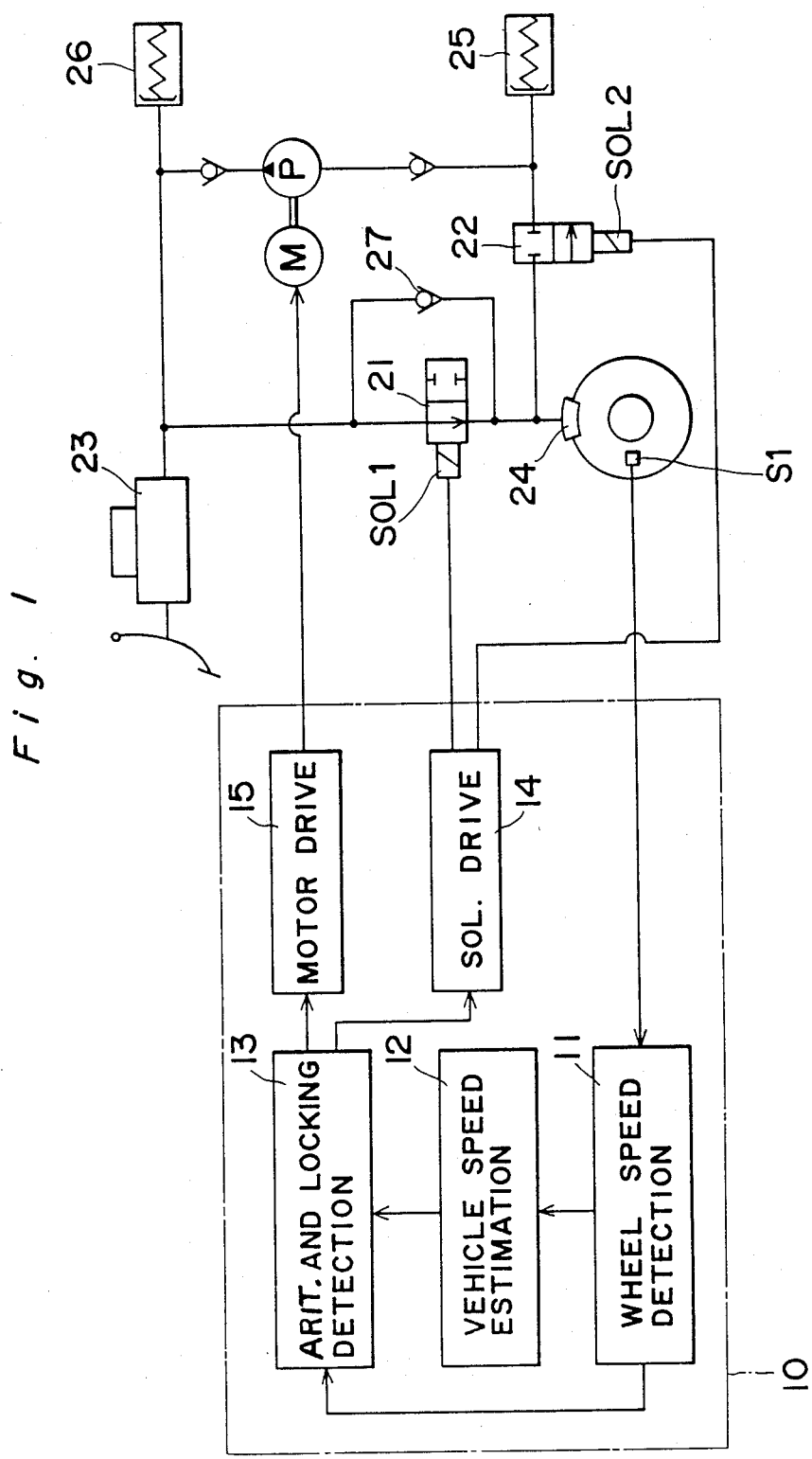
FIG. 1 is a diagram of an antiskid control device according to the present invention.

Referring now to the drawings, there is shown in FIG. 1, an antiskid control device according to the present invention, which includes an electronic control device 10. Upon reception of signals from wheel speed sensors S1, S2, S3 and S4, the electronic control device 10 performs various calculations and decisions so as to output a control signal of a hydraulic circuit. Hereinbelow, reference is given to only the wheel speed sensor S1 for the sake of brevity. The electronic control signal 10 includes a wheel speed detecting means 11, a vehicle speed estimating means 12, an arithmetic and locking detecting means 13, a solenoid driving circuit 14 and a motor driving circuit 15.

An AC voltage signal from the wheel speed sensor S1 is converted into pulses and is supplied, as a wheel speed signal, to the vehicle speed estimating means 12, is the wheel speed detecting means 11, for counting and calculating the pulses. In the vehicle speed estimating means 12, a vehicle speed is estimated. When either a deceleration calculated by the arithmetic and locking detecting means 13 drops below a predetermined reference or a slip speed (i.e. a difference between the estimated vehicle speed and the estimated wheel speed) exceeds a predetermined reference, the arithmetic and locking detecting means 13 detects creation of a locking trend of the wheels and issues a pressure reducing command to the solenoid driving circuit 14. Then, the solenoid driving circuit 14 energizes solenoids SOL1 and SOL2. As a result, a pressure control valve 21 is displaced in the leftward direction in FIG. 1 to cut off a hydraulic circuit from a master cylinder 23 to a wheel cylinder 24, while a pressure control valve 22 is displaced in the upward direction in FIG. 1 to communicate a circuit between the wheel cylinder 24 and a reservoir 25. A motor M is started by the motor driving circuit 15, so that brake fluid carried from the reservoir 25 by a pump P is returned to an accumulator 26 and the master cylinder 23 and thus, a hydraulic braking pressure drops.

Subsequently, when the deceleration or the slip speed exceeds the corresponding reference value upon recovery of the wheels from locking, the arithmetic and locking detecting means 13 decides that the wheels have recovered from locking and outputs a pressure increasing command to the solenoid driving circuit 14. Thus, the solenoid driving circuit 14 de-energizes the solenoids SOL1 and SOL2 so as to reinstate the pressure control valves 21 and 22 to the states of FIG. 1. Therefore, the hydraulic circuit between the hydraulic pressure generation source and the wheel cylinder 24 is communicated, and the hydraulic braking pressure is increased.

Meanwhile, if, in the course of issuance of the pressure reducing command or the pressure increasing command, a pressure holding command is issued by interrupting issuance of the pressure reducing command or the pressure increasing command, it can be so arranged that the solenoid SOL1 is energized and the solenoid SOL2 is de-energized. As a result, the pressure control valve 21 is displaced in the leftward direction in FIG. 1 to cut off the hydraulic circuit from the master cylinder 23 to the wheel cylinder 24, while the pressure control valve 22 remains at the position of FIG. 1 and thus, the hydraulic braking pressure is maintained at a constant value since hydraulic pressure is contained in the wheel cylinder 24. In FIG. 1, reference numeral 27 denotes a by-pass valve.

Furthermore, conditions and timing for issuing the pressure holding command in the course of issuance of the pressure reducing command can be selected variously as follows. For example, in one method, the pressure holding command is issued upon lapse of a predetermined time period from start of issuance of the pressure reducing command. In another method, the pressure holding command is issued when the wheel deceleration has exceeded a predetermined threshold value.

Similarly, conditions and timing for alternately issuing the pressure increasing command and the pressure holding command can be selected variously. Generally, the pressure holding command is issued at a fixed time interval by, for example, a pulse generator.

Meanwhile, in order to decide that a locking trend of the wheels has been created or the wheels have recovered from locking, other factors can also be added to the above described deceleration and the slip speed.

Figure 2:
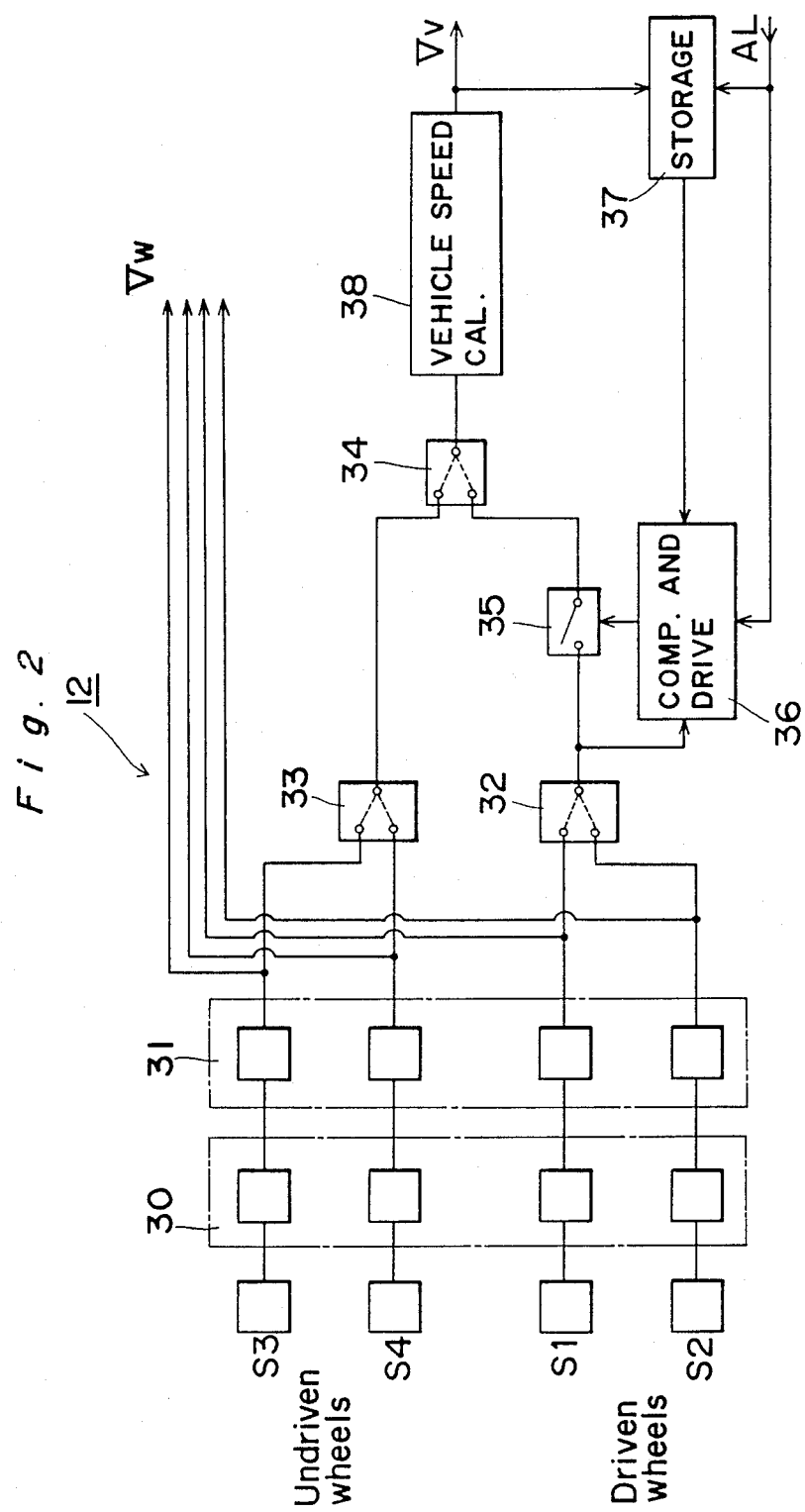
FIG. 2 is a block diagram of a vehicle speed estimating means employed in the antiskid control device of FIG. 1.

Hereinbelow, the vehicle speed estimating means 12 is described with reference to FIG. 2. As shown in FIG. 2, signals from the wheel speed sensors S1 and S2 of the driven wheels and signals from the speed sensors S3 and S4 of the undriven wheels are input to an interface circuit 30 so to be converted into pulses. Then, the pulses are counted and calculated in a wheel speed calculating means 31 in order to be supplied, as binary wheel speed signals Vw, to both arithmetic and locking detecting means 13 and the vehicle speed estimating means 12. Namely, the interface circuit 30 and the wheel speed calculating means 31 correspond to the wheel speed detecting means 11.

The wheel speed signals Vw thus obtained are compared with each other by select-high comparators 32 and 33. The wheel speeds of the driven wheels are compared by the select-high comparator 32 and a higher wheel speed is selected. Similarly, the wheel speeds of the undriven wheels are compared by the select-high comparator 33 and a higher wheel speed is selected. The higher wheel speed of the undriven wheels is further applied to a select-high comparator 34. On the other hand, the larger one of the wheel speeds of the driven wheels, which has been selected by the select-high comparator 32, is applied to the select-high comparator 34 through a switch 35. This switch 35 is opened and closed by a comparison and drive circuit 36 which compares a speed stored in a storage circuit 37 with the wheel speed selected by the select-high comparator 32 and closes the switch 35 only when the wheel speed selected by the select-high comparator 32 is smaller than the speed stored in the storage circuit 37.

It should be noted that the storage circuit 37 is started for its actuation by a signal AL, indicating that antiskid control is being performed, in order to store the estimated vehicle speed Vv obtained at that time. Therefore, the speed stored in the storage circuit 37 is updated to a new estimated vehicle speed Vv during execution of antiskid control. Alternatively, as shown in FIG. 3, the speed stored in the storage circuit 37 may be updated to the wheel speed selected ultimately by the select-high comparator 34 rather than the new estimated vehicle speed Vv. The comparison and drive circuit 36 is likewise started for its actuation by the signal AL.

During nonexecution of antiskid control, the signal AL is not produced, so that the circuits 36 and 37 are not actuated and the switch 35 is open. Hence, the higher wheel speed of the undriven wheels is applied from the select-high comparator 33 to the select-high comparator 34 and no signal is applied from the select-high comparator 32 to the select-high comparator 34. Therefore, the output of the select-high comparator 33, namely, the higher wheel speed of the undriven wheels is selected and applied to a calculation circuit 38 for calculating the estimated vehicle speed Vv.

When antiskid control has been started, the signal AL is produced, so that the circuits 36 and 37 are actuated such that the estimated vehicle speed at that time is stored in the storage circuit 37. This speed stored in the storage circuit 37 and the wheel speed of the driven wheels selected by the select-high comparator 32 are compared by the circuit 36. If the latter is smaller than the former, the switch 35 is closed, so that the wheel speed of the driven wheels selected by the select-high comparator 32 is input to the select-high comparator 34 to be compared with the higher wheel speed of the undriven wheels selected by the select-high comparator 33. Therefore, a maximum among the wheel speeds of the undriven wheels and to the wheel speeds of the driven wheels smaller than the speed stored in the storage circuit 37 is selected.

Meanwhile, the circuits referred to above can be incorporated, as a program, into a microcomputer.

As is clear from the foregoing description, in accordance with the present invention, the estimated vehicle speed is calculated without receiving the brake pedal manipulation signal. Thus, even if the detection means for detecting manipulation of the brake pedal malfunctions, accuracy of the estimated vehicle speed does not drop.

Furthermore, in accordance with the present invention, even if wheel spin occurs when antiskid control has been erroneously started during operation of the motor vehicle on a bumpy road, the wheel speeds of the driven wheels higher than the estimated vehicle speed are not used for calculating the estimated vehicle speed. Thus, estimated vehicle speed does not become extraordinarily high.

Moreover, in accordance with the present invention, even if the wheel speeds of the undriven wheels become excessively low by manipulating the parking brake prior to manipulation of the brake pedal, the wheel speeds of the driven wheels can be used for calculating the estimated vehicle speed, after the start of the antiskid control. Thus, the estimated vehicle speed does not become excessively low and a highly accurate estimated vehicle speed can be obtained at all times.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An antiskid control device for a vehicle having driven and undriven wheels comprising:
   a wheel speed detecting means for detecting speeds of wheels of a motor vehicle;
   a vehicle speed estimating means for calculating a speed of a vehicle body of said motor vehicle on the basis of wheel speed signals supplied from said wheel speed detecting means, said vehicle speed estimating means including:
   a first comparator means for comparing the speeds of the wheels to select a higher wheel speed of the wheels, said first comparator means having a plurality of select-high comparators including a first select-high comparator which selects a higher wheel speed of the driven wheels, a second select-high comparator which selects a higher wheel speed of the undriven wheels, and a third select-high comparator which selects a higher wheel speed of the wheels,
   a storage means for storing the speed of the vehicle body calculated at the time of the start of execution of antiskid control, and
   a second comparator means for comparing the speed stored in said storage means with the higher wheel speed of the driven wheels which has been selected by said first select-high comparator of said first comparator means, said second comparator means enabling the higher wheel speed of the driven wheels to be output therefrom when the higher wheel speed of the driven wheels does not exceed the speed of the vehicle body stored in said storage means and execution of antiskid control has already started, and disabling the higher wheel speed of the driven wheels from being output therefrom when the higher wheel speed of the driven wheels exceeds the speed of the vehicle body stored in said storage means or execution of antiskid control has not yet started;
   an arithmetic and locking detecting means, which performs arithmetic operations on the basis of signals supplied from said wheel speed detecting means and said vehicle speed estimating means, for issuing a first command of decreasing a brake pressure of the wheels when having detected that the wheels are in a state towards locking and issuing a second command of increasing the brake pressure, when having detected that the wheels are in a state towards recovery from locking, and a solenoid driving means for driving a solenoid of a pressure control valve of a hydraulic circuit in response to the first and second commands from said arithmetic and locking detecting means;

wherein during nonexecution of antiskid control, said storage means and said second comparator means are not actuated, disabling the higher wheel speed of the driven wheels from being output, and a higher wheel speed of the undriven wheels is selected by said first select high comparator such that the speed of the vehicle body is calculated on the basis of said highest speed; while during execution of antiskid control, said storage means and said second comparator are actuated, enabling the higher wheel speed of the driven wheels to be output such that another highest wheel speed among the speeds of the undriven wheels and the higher wheel speed of the driven wheels lower than the speed stored in said storage means is selected by said first select high comparator such that the speed of the body is calculated on the basis of said another highest speed.

2. An antiskid control device as claimed in claim 1, further comprising:

a motor driving circuit for driving a motor for actuating a pump for a brake of said motor vehicle.

3. An antiskid control device as claimed in claim 1, wherein said wheel speed detecting means includes an interface circuit and a wheel speed calculating circuit for calculating the speeds of the wheels.

4. An antiskid control device as claimed in claim 2, wherein said wheel speed detecting means includes an interface circuit and a wheel speed calculating circuit for calculating the speeds of the wheels.

5. An antiskid control device for a vehicle having driven and undriven wheels comprising:

a wheel speed detecting means for detecting speeds of wheels of a motor vehicle;

a vehicle speed estimating means for calculating a speed of a vehicle body of said motor vehicle on the basis of wheel speed signals supplied from said wheel speed detecting means, said vehicle estimating means including:

a first comparator means for comparing the speeds of the wheels to select a higher wheel speed of the wheels, said first comparator means having a plurality of select-high comparators including a first select-high comparator which selects a higher wheel speed of the driven wheels, a second select-high comparator which selects a higher wheel speed of the undriven wheels, and a third select-high comparator which selects a higher wheel speed of the wheels, a storage means for storing the higher wheel speed of the wheels ultimately selected by said first comparator means at the time of start of execution of antiskid control, and a second comparator means for comparing the speed stored in said storage means with the higher wheel speed of the driven wheels which has been selected by said first select-high comparator of said first comparator means, said second comparator means enabling the higher wheel speed of the driven wheels to be output therefrom when the higher wheel speed of the driven wheels does not exceed the higher wheel speed stored in said storage means and execution of antiskid control has already started, and disabling the higher wheel speed of the driven wheels from being output therefrom when the higher wheel speed of the driven wheels exceeds the speed of the vehicle body stored in said storage means or execution of antiskid control has not yet started;

an arithmetic and locking detecting means, which performs arithmetic operations on the basis of signals supplied from said wheel speed detecting means and said vehicle speed estimating means, for issuing a first command of decreasing a brake pressure of the wheels when having detected that the wheels are in a state towards locking and issuing a second command of increasing the brake pressure when having detected that the wheels are in a state towards recovery from locking; and a solenoid driving means for driving a solenoid of a pressure control valve of a hydraulic circuit in response to the first and second commands from said arithmetic and locking detecting means;

wherein during nonexecution of antiskid control, said storage means and said second comparator means are not actuated, disabling the higher wheel speed of the driven wheels from being output, and a higher wheel speed of the undriven wheels is selected by said first select high comparator such that the speed of the vehicle body is calculated on the basis of said highest speed; while during execution of antiskid control, said storage means and said second comparator are actuated, enabling the higher wheel speed of the driven wheels to be output such that another highest wheel speed among the speeds of the undriven wheels and the higher wheel speed of the driven wheels lower than the speed stored in said storage means is selected by said first select high comparator such that the speed of the body is calculated on the basis of said another highest speed.

6. An antiskid control device as claimed in claim 5, further comprising:

a motor driving circuit for driving a motor for actuating a pump for a brake of said motor vehicle.

7. An antiskid control device as claimed in claim 5, wherein said wheel speed detecting means includes an interface circuit and a wheel speed calculating circuit for calculating the speeds of the wheels.

8. An antiskid control device as claimed in claim 6, wherein said wheel speed detecting means includes an interface circuit and a wheel speed calculating circuit for calculating the speeds of the wheels.

* * * * *